United States Patent [19]
Nowisch et al.

[11] 3,950,988
[45] Apr. 20, 1976

[54] APPARATUS FOR MEASURING TENSION IN A MOVING WEB

[75] Inventors: Heinz K. Nowisch; Richard W. Phelps, both of Fulton, N.Y.

[73] Assignee: The Black Clawson Company, Middletown, Ohio

[22] Filed: Jan. 11, 1975

[21] Appl. No.: 549,066

Related U.S. Application Data

[63] Continuation-in-part of Ser. No. 462,248, April 19, 1974, abandoned.

[52] U.S. Cl. ............................................. 73/144
[51] Int. Cl.² ...................................... G01L 5/04
[58] Field of Search ............................. 73/143, 144

[56] References Cited
UNITED STATES PATENTS
2,538,932    1/1951    Campbell ............................ 73/144

FOREIGN PATENTS OR APPLICATIONS
730,035    5/1955    United Kingdom ................. 73/144
944,527    12/1963    United Kingdom ................. 73/144

*Primary Examiner*—Charles A. Ruehl
*Attorney, Agent, or Firm*—Biebel, French & Nauman

[57] ABSTRACT

In order to measure tension in a moving web independently of the frictional forces developed between the web and stationary parts of the measuring mechanism, a drag board assembly is provided with a pivotal mounting on an axis which is so located with respect to the loop into which the web is deflected in passing from the adjacent guide roll on the upstream side to the adjacent guide roll downstream thereof that the forces generated by web tension acting on the drag board assembly create a turning moment about its pivot axis which is continuously measured by a load cell or other load sensing means, but whatever moments of force are generated by friction between the web and the drag board assembly are effectively neutralized by directing them through the pivot axis.

4 Claims, 6 Drawing Figures

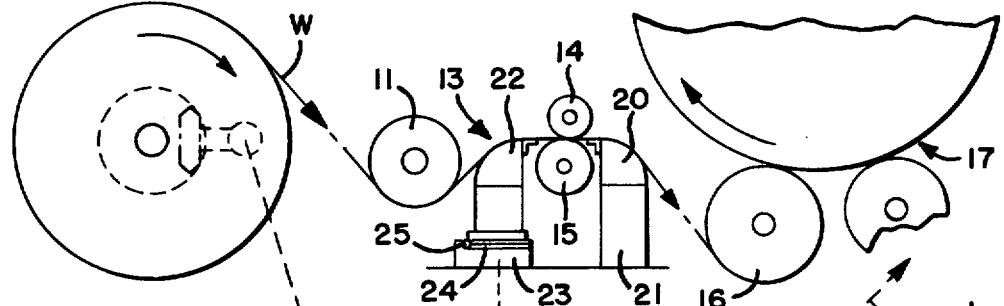
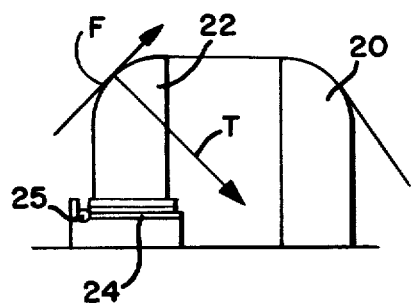
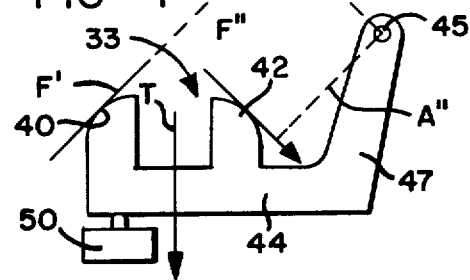
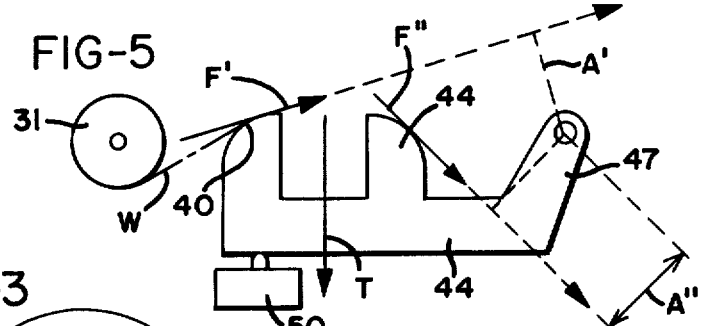
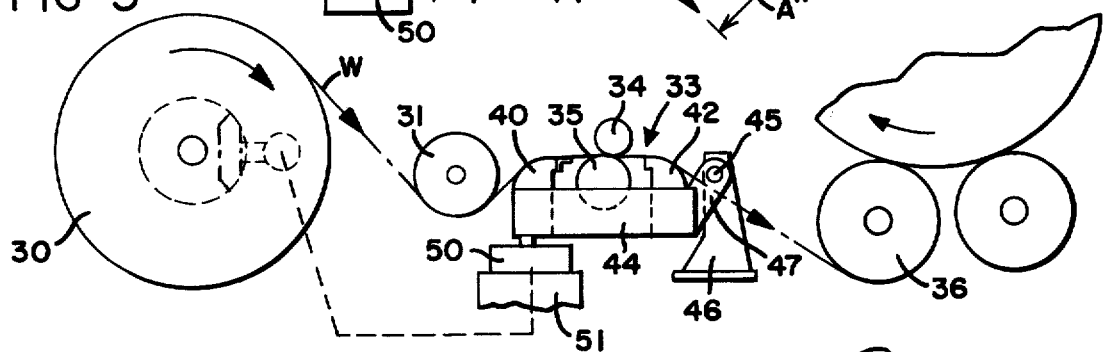
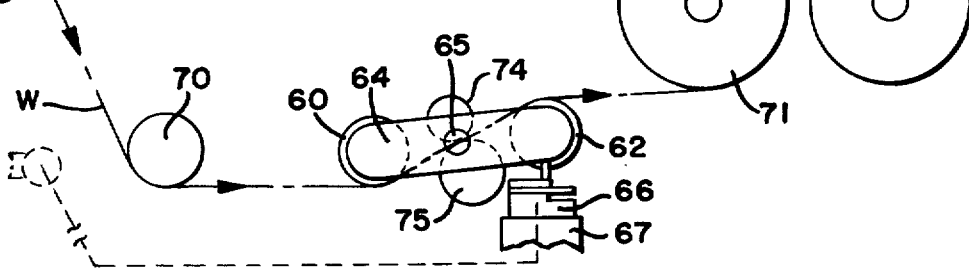

've3,950,988

APPARATUS FOR MEASURING TENSION IN A MOVING WEB

CROSS REFERENCE TO COPENDING APPLICATION

This application is a continuation-in-part of our application Ser. No. 462,248 filed Apr. 19, 1974, now abandoned.

BACKGROUND OF THE INVENTION

This invention relates to apparatus for measuring tension in a moving web, especially a web of a paper.

In the manufacture of paper products, web tension control is important to the production of products of consistent quality. Many different types of sensing and control devices have been used for this purpose, including dancer rolls controlling web speed, braking devices controlled by means for continuously measuring the braking force applied to the web, and load sensing devices in a variety of positions. Typical examples of prior art practice include many arrangements of draw rolls or drag bars partially wrapped by the web and provided with load sensing means positioned to sense either the tendency of the roll or bar to be displaced by web tension or the tendency of a non-rotating roll or bar to be turned by its frictional engagement with the moving web.

Such installations are subject to the disadvantage that while friction between the web and the roll is a significant factor, it varies considerably with the speed of the web, especially in the case of a non-rotating roll, because of the tendency of air to be entrained between the web and the roll as speed increases and thereby to serve as a lubricant decreasing the frictional effects. Experience has shown that the friction effect is greatest at low web speeds, that it decreases relatively gradually as web speeds increase, and that it effectively disappears suddenly at a speed of the order of 3,000 per minute, although this value is obviously subject to variation depending upon the frictional characteristics of the web and of the draw roll or bar which it wraps.

The practical result of these varying conditions as applied to the control of web tension is that measurement by means such as a load cell or strain gauge of the load on the draw load or bar is practicable at low web speeds even though the measured load includes friction as well as true web tension. A serious problem arises, however, in the speed range where the friction effect disappears, because this causes a correspondingly sudden change in the load sensed by the load cell or strain gauge, causing it to attempt to compensate for a change in web tension which did not actually take place, and thereby disrupting the actual tension conditions, sometimes to the point of breaking the web.

It is especially important to control web tension accurately in a web slitting line, by reason of the relatively high web speeds, which may range as high as 10,000 feet per minute. A station in a slitting line which is especially well adapted for cooperation with load sensing means is the drag roll or drag table assembly commonly used to support the moving paper web on each side of the slitter rolls. A typical such assembly incorporates a pair of rolls or a pair of arcuately curved shoes positioned on either side of the slitter rolls in such relation with a pair of guide rolls respectively upstream and downstream of the slitter rolls as to deflect the web out of the direct path between the guide rolls, and many arrangements of load sensing means have been combined with drag board assemblies.

One example of a drag board assembly incorporating load sensing means for continuously measuring tension in a moving paper web is shown in Canadian Pat. No. 931,985, wherein a load cell is positioned under one of the drag bars to measure the downward force applied thereto by the web. The arrangement in that patent, however, is such that the load cell responds to both web tension and the friction between the web and the drag board, and its accuracy is therefore affected by variations in web speed, especially through the value where the friction load between the web and the drag bar disappears.

SUMMARY OF THE INVENTION

The main objective of the present invention is to provide a drag board assembly incorporating means for sensing the load applied to the drag board by web tension and which is so mounted and arranged as to reduce the response to friction between the web and the drag board to a minimum at all speeds and thereby to respond substantially entirely to web tension.

The invention accomplishes this objective by means of a drag board assembly provided with a pivotal mounting on an axis so located with respect to the loop into which the web is deflected in passing from the adjacent guide roll on the upstream side to the adjacent guide roll downstream thereof that any moments of force generated with respect to the pivot axis by friction between the web and the drag board assembly are effectively neutralized, but the forces generated by web tension acting on the drag board assembly create a turning moment about its pivot axis which is continuously measured by load sensing means such as a load cell or a strain gauge.

Stated more specifically with respect to an installation wherein the drag board assembly is positioned to deflect the web path into an upward loop between adjacent rolls, the pivot axis of the drag board assembly is located in such spaced relation with the drag board surfaces which have frictional engagement with the web that the resulting frictional forces are resolved into turning moments of equal force which cancel each other. At the same time, the tension forces are resolved into one or more vectors acting in such direction as to create a turning moment effective on the drag board assembly in the same direction about its pivot axis.

The net result of the application of the principles of the invention as just summarized is that irrespective of web speed and the value of the frictional forces generated between the web and the drag board assembly, friction will have no significant effect in the creating of a turning moment about the pivot axis of the drag board assembly and thus will not be sensed by the load cell or other sensing means. On the other hand, the tension in the web is transformed into a turning moment which is directly effective on the load cell and provides a true measure of web tension over the full range of web speeds.

The principles of the invention are applicable to a variety of specific installations, as will be apparent from the description of the preferred embodiments set forth below.

BRIEF DESCRIPTION OF THE DRAWINGS

FIG. 1 is a diagrammatic view illustrating a typical prior art installation of load measuring means to a drag bar in a web slitting line;

FIG. 2 is a vector diagram illustrating the operation of the invention in FIG. 1;

FIG. 3 is a view similar to FIG. 1 showing one embodiment of the invention;

FIG. 4 is a vector diagram illustrating the operation of the embodiment of FIG. 3;

FIG. 5 is a diagram similar to FIG. 4 showing a modification of the arrangement of FIG. 3; and FIG. 6 is a view similar to FIGS. 1 and 3 illustrating another embodiment of the invention.

DESCRIPTION OF THE PREFERRED EMBODIMENTS

FIGS. 1 and 2 illustrate an installation in a slitter line of a load sensing arrangement embodying the same principles as Canadian Pat. No. 931,985. The web W passes from an unwind 10 under a squaring roll 11, upwardly and across the drag board assembly 13 which straddles the slitter units 14 and 15, and then downwardly to the under side of one of the driving drums 16 of a winder 17. Thus the drag board assembly 13 deflects the web up to an upward loop as it passes between the roll 11 and drum 16 which act as guide rolls in this context.

The drag board assembly 13 includes an arcuately curved bar or shoe 20 on a fixed base 21 on the downstream side of the slitter units, and a similarly arcuately curved bar or shoe 22 on the upstream side of the slitter units. The upstream drag bar 22 is mounted on a fixed base 23 by load sensing means 24 which includes a horizontal pivot 25 and a load cell, strain gauge or other comparable means for sensing any turning moment of the drag bar 22 about the pivot axis 25. Commonly the load sensing means 24 is connected in a system, represented by the dotted line 26, for controlling the braking force on the unwind 10 in such manner as to increase or decrease that force as required to maintain constant the load measured by load sensing means 24.

The vector diagram in FIG. 2 illustrates the forces affecting the load sensing means 24 in operation. The tension load is resolved into a force represented by arrow T which is applied in a downward direction at 45° to the horizontal and thus creates a definite turning moment in clockwise direction about pivot 25. Similarly the friction load generated between the web and drag board 22 is resolved into a force represented by the arrow F which is directed upwardly at approximately 45° to the horizontal and therefore also generates a clockwise turning moment about pivot 25.

Under these conditions, both tension and friction will act on the load sensing means 24 in the same way, and since it cannot distinguish between them, it will continue to control braking force in unwind 10 as required to maintain a constant measured load, irrespective of whether that load is created by tension or by a mixture of tension and friction. The resulting tension conditions will not be too objectionable at low speeds, e.g. substantially below 3,000 feet per minute, but as speed increases past the value at which the friction load drops off sharply, the resulting decrease in the turning moment about pivot 25 will cause the load sensing means to measure a decrease in tension which it will interpret as requiring greater braking force in the unwind 10. The resulting relatively sudden increase in braking force can cause the web to break, and similarly undesirable results can occur when web speed drops through the value at which the frictional force reasserts itself, since the load sensing means will then register a sudden increase in load calling for a decrease in braking force which is not actually needed or wanted.

FIGS. 3 and 4 illustrate one embodiment of the invention which overcomes these disadvantages of the prior art and makes it possible to measure web tension with the aid of a drag board assembly independently of the friction between the web and the drag board. In FIG. 3, the path of the web W is essentially the same as in FIG. 1, namely from an unwind 30, under a roll 31, upwardly and across the drag board assembly 33 which straddles slitter units 34 and 35, and then downwardly to the under side of one of the driving drums 36 of a winder.

The drag board assembly 33 includes a pair of arcuately curved bars or shoes 40 and 42 which are mounted as a unit in a frame 44 provided with a trunnion mounting on its downstream side comprising a pivot shaft 45 supported on fixed brackets 46 and pivotally supporting an upwardly extending arm 47 at each end of the frame 44. Load sensing means 50 corresponding to the load sensing means 24 is mounted between a fixed base 51 and the frame 44 at a position on the upstream side of the drag board assembly to measure turning moments of the drag board assembly with respect to the pivot shaft 45.

The vector diagram in FIG. 4 illustrates the forces affecting the load sensing means 50 in operation. The tension load is resolved into an essentially downward force represented by arrow T generally in the vertical plane intermediate the drag bars 40 and 42. This tension force therefore produces a counterclockwise turning moment about pivot shaft 45 which is continuously measured by the load sensing means 50.

The friction loads generated between the web and the drag boards are represented initially by arrows F' and F'' directed generally at 45° respectively upwardly and downwardly in the downstream direction of the web. These forces resolve themselves into turning moments in opposite direction about pivot shaft 45. Their respective moments A' A'' correspond to normals from the projections of arrows F' and F'' to the axis of shaft 45, and the proportions and arrangement of the parts are readily calculated, as shown, so that these moment arms are equal and these friction forces are effectively neutralized so far as creating any turning moment about this shaft. Another way of accomplishing the same result with a different location of the shaft 45, as shown in FIG. 5, is to adjust guide roll 31 to the proper position so that arrows F' and F'' make such different angles with the vertical that arms A' and A'' are equal.

Under these conditions as explained in connection with FIGS. 4 and 5 therefore, the magnitude of the frictional forces is of no significance, because they do not create any load on the drag board assembly which is measurable by the load sensing means 50. On the other hand, the full force of web tension does create a turning moment of such magnitude and direction as to be directly measurable by the load sensing means 50. Thus the reading of the load sensing means 50 represents only web tension at all web speeds.

FIG. 6 illustrates the application of the invention to another construction of drag board assembly in such manner as to make it possible to measure web tension independently of friction. In FIG. 6, the drag board assembly comprises a pair of cylindrically curved tubular bars 60 and 62 connected into a unit by means of end pieces 64, and this unit is provided with a pivotal mounting 65 centrally located with respect to the centers of the bars 60 and 62. Load sensing means 66 is mounted on fixed base structure 67 in position to sense clockwise turning moments of the drag board assembly about the pivot 65.

The web W in FIG. 6 travels downwardly from an unwind to the squaring roll 70 and then under the upstream bar 60, and upwardly and over the downstream bar 62 to one of the drums 71 of a winder. For optimum results the web lead from roll 70 to bar 60 should be parallel with the web lead from bar 62 to roll 71. The proportions of the bars 60 and 62 and their end pieces 64 provide space for the slitter units 74–75 in enclosed relation with the drag board assembly.

In the arrangement of FIG. 6, the tension load is resolved into an upward force on the drag bar 60 and a downward force on the drag bar 62, each of which creates a clockwise turning moment on the drag bar assembly which can be directly measured by the load sensing means 66. The friction loads, however, are effectively neutralized and prevented from being registered by the load sensing means 66, because the friction load between the downstream drag bar 60 and the web is essentially upward to the left in such direction that it passes through the axis of pivot mounting 65, and since the same is true of the friction load between the web and the downstream drag bar 62, neither has any effect in creating a turning moment about that axis.

Note that the arrangement of FIG. 6 could be modified without affecting its principle of operation for the purpose of the invention by reversing the threading of the web so that it travels counterclockwise over bar 60 and clockwise under bar 62, and by relocating the load sensing means to measure the resulting tension-induced counterclockwise turning moment on the drag bar assembly. If, however, the threading of the web were changed so that it ran in the same direction under or over both of bars 60 and 62, the result would be to measure only the turning moment created by frictional forces, while the tension loads on the two drag bars would develop turning moments in opposite directions which would cancel each other out.

While the forms of apparatus herein described constitutes preferred embodiments of the invention, it is to be understood that the invention is not limited to these precise forms of apparatus, and that changes may be made therein without departing from the scope of the invention.

What is claimed is:

1. Apparatus for sensing the tension of a moving web traveling from one roll to another, comprising:
    a. a drag board assembly extending the full width of the web and arranged to deflect the web out of the direct path between said rolls,
    b. said drag board assembly having two surface areas adapted for frictional engagement with the moving web,
    c. fixed base means including pivot means extending across the path of the web,
    d. means pivotally mounting said drag board assembly on said pivot means whereby the tension in the web produces a turning moment on said assembly in a predetermined direction about said pivot means,
    e. load sensing means positioned to sense any turning moment on said drag board assembly about said pivot means, and
    f. said mounting means being so positioned and arranged that forces developed by friction between the web and said surface areas and tending to create turning moments of said assembly about said pivot means are of substantially equal values and of opposite directions with respect to said pivot means.

2. Tension sensing apparatus as defined in claim 1 wherein said frictional surface areas are arcuately curved and spaced from each other, and wherein said mounting means is positioned and arranged to locate the axis of said pivot means substantially in the plane defined by the center lines of the portions of said frictional surface areas wrapped by the web.

3. Tension sensing apparatus as defined in claim 1 wherein said drag board assembly is positioned to cause the web to wrap said frictional surface portions in the same sense and thereby to deflect the portion of the web between said rolls into a loop, and wherein said pivot means is located outside of said loop.

4. Tension sensing apparatus as defined in claim 1 wherein the web is caused to wrap said frictional surface area portions in opposite senses, and thereby to direct the portion of the web between said rolls into a reversely curved path, and wherein said pivot means is located intermediate the centers of curvature of said surface means.

* * * * *